United States Patent [19]
Burgess

[11] Patent Number: 4,784,427
[45] Date of Patent: Nov. 15, 1988

[54] ENCLOSURE ASSEMBLY FOR OPEN BED VEHICLE

[76] Inventor: Guy A. Burgess, 501 Oak St., Melbourne Beach, Fla. 32951

[21] Appl. No.: 21,149

[22] Filed: Feb. 26, 1987

[51] Int. Cl.[4] ............................................. B60P 7/04
[52] U.S. Cl. .................................... 296/98; 296/100; 160/314
[58] Field of Search .................. 296/98, 100; 160/298, 160/299, 257, 291, 314, 315

[56] References Cited

U.S. PATENT DOCUMENTS

| | | | |
|---|---|---|---|
| 3,472,548 | 10/1969 | Comisac | 296/184 |
| 3,759,568 | 9/1973 | Unruh | 160/315 |
| 3,820,840 | 6/1974 | Forsberg | 296/100 |
| 3,986,749 | 10/1976 | Hull et al. | 296/100 |
| 4,046,416 | 9/1977 | Penner | 296/100 |
| 4,067,603 | 1/1978 | Fenton | 296/100 |
| 4,189,178 | 2/1980 | Cramaro | 296/100 |
| 4,563,034 | 1/1986 | Lamb | 296/98 |
| 4,611,848 | 9/1986 | Romano | 296/98 |

FOREIGN PATENT DOCUMENTS

| | | | |
|---|---|---|---|
| 1060927 | 8/1979 | Canada | 296/98 |
| 2384651 | 11/1978 | France | 296/98 |
| 1003892 | 9/1965 | United Kingdom | 296/100 |

Primary Examiner—Robert B. Reeves
Assistant Examiner—Frank Williams
Attorney, Agent, or Firm—Antonelli, Terry & Wands

[57] ABSTRACT

A sectioned, roller type extensible and retractable enclosure for open bed vehicles employs a spring mechanism through which the slats of the cover are maintained in tension (in the direction of the length of the cover and away from the roll) during rotation of the stowage roller. As a result of this tension, the slats of the cover are effectively prevented from drooping as they are unwound from the roll and enter the guide channels, so that the unwanted bunching of the slats does not occur.

35 Claims, 4 Drawing Sheets

ENCLOSURE ASSEMBLY FOR OPEN BED VEHICLE

FIELD OF THE INVENTION

The present invention relates in general to slidable cover mechanisms and, in particular, to a horizontally extensible and retractable sectional cover apparatus for a vehicle of the type having an open bed, such as a pickup truck or the like.

BACKGROUND OF THE INVENTION

Practical security and storage enclosure mechanisms for open bed vehicles, such as pickup trucks, preferably incorporate some form of extensible and retractable cover arrangement that facilitates access to the truck bed, while still providing a mechanically rigid assembly that protects the contents of the bed when fully closed. To this end there have been proposed a variety of vehicle bed enclosure apparatuses which employ sectional covers that are designed to be foldable or rollable across the top of the vehicle bed between their stowed and fully deployed (enclosing) configurations.

(For an overview of typical examples of these types of vehicle body (e.g. truck bed) enclosure mechanisms, attention may be directed to the U.S. Pat. Nos. to Hull et al, 3,986,749, Forsberg, 3,820,840 and Cross, 3,649,072 (which show foldable arrangements) and the U.S. Pat. Nos. to Renquist 2,771,319, Comisac, 3,472,548 and Campbell 4,252,362 (describing sectional roll-up configurations). In addition to these foldable and roll-up sectional vehicle bed enclosures, the (Patent) literature describes non-retractable (e.g. non-foldable) sectional vehicle bed enclosures, such as those disclosed in the U.S. Pat. Nos. to Deshores 3,762,763, Hallock et al, 3,165,352, Albrecht et al 4,199,188, Lutgen 3,342,523 and Fellenstein 3,829,151, and roll-up pliable material covers (e.g. sand and gravel covers) such as those detailed in the U.S. Pat. Nos. to Thompson et al 3,366,414, Schultz 2,757,042, McKeon 4,138,154, Johnsen 4,212,492, Dimmer et al, 4,302,043, Petretti 4,082,347 and Rosenvold 4,234,224. From a practical standpoint, however, these configurations are incapable of operating as practical extensible and retractable security enclosures.)

For the most part foldable cover arrangements are large sized, due to both the widths of the folds of the cover and the resulting volume of stowage area required to accommodate the cover in its folded condition. Rollable arrangements of interlinked sections (slats), on the other hand, are designed to provide a more compact stowage configuration (as the sections of the cover are wrapped around a (rotatable) bar or axle) and therefore more adaptable to today's smaller light utility vehicles. Disadvantageously, however, conventional rollable sectional vehicle bed enclosures have a tendency to jam in the vicinity of the stowage box as the slats of the cover are sequentially unrolled from their wrapped, stowed condition.

Figure 1:
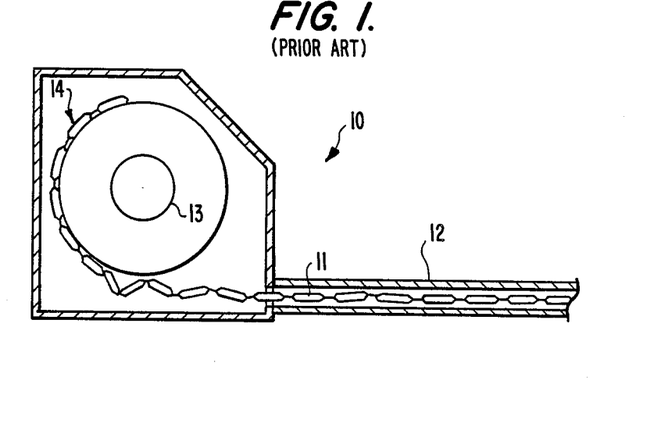
FIG. 1 is a diagrammatic side view of the jamming of the slats of a conventional rollable slatted cover type vehicle bed enclosure mechanism.

More particularly, with reference to FIG. 1, there is shown a diagrammatic side view of a rollable vehicle bed enclosure 10 formed of a plurality of interlinked parallel slats 11 that are arranged to be unwound from a rotatable stowage bar 13 and slidable along a pair of guide tracks or channels 12 affixed to the sidewalls of a vehicle bed. The respective slats 11 are unrolled from their rolled-up condition, shown at 14, by (motor-driven) rotation (counter-clockwise as shown in FIG. 1) of stowage bar 13, causing the slats to be effectively pushed out from the roll 14 and into guide channel 12. Due to the influence of gravity, however, which assists in moving the slats off the stowage bar 13 into their extended position, the slats tend to fall away from the roll 14 in an initially vertical direction causing the cover to droop slightly upstream of the entry point of the slats into the channel 12. Consequently, as the stowage bar 13 continues to rotate and push the slats outwardly and toward the channel 12, the slats become bunched together and jam at the entrance to the channel, thereby inhibiting proper operation of the enclosure.

SUMMARY OF THE INVENTION

In accordance with the present invention, the jamming problem associated with a conventional rollable vehicle bed enclosure formed of interconnected slats is obviated by a new and improved sectioned, roller type extensible and retractable enclosure in which the slats of the cover are maintained in tension (in the direction of the length of the cover and away from the roll) during rotation of the stowage roller. As a result of this tension, the slats of the cover are effectively prevented from drooping as they are unwound from the roll and enter the guide channels, so that the unwanted bunching of the slats does not occur. In addition, because the direction of the tension is away from the roll and towards the channels, the slats are assisted in entering into and travelling along the channels during unwinding of the cover from the rotatable stowage bar; during retraction of the enclosure the tension acts to enhance a tight winding of the slats of the cover around the stowage bar.

Pursuant to a first embodiment of the invention, tensioning of the slats is effected by coupling a constant force spring mechanism to an end slat of the rollable cover. The spring mechanism may be comprised of a respective pair of constant force spring elements arranged in tandem and located at the outer ends (relative to the position of the stowage box adjacent to the vehicle cab) of each guide channel. As the slats of the cover are retracted from their fully deployed position (enclosing the vehicle bed) and become wound onto and around the stowage bar, the bands of the constant force spring elements are drawn into the channels. Although the spring's constant force is in a direction opposite to wind-up direction of the stowage bar, it is less than that imparted to stowage bar, so that the roller drive mechanism causes the cover shutter to be retracted and the slats are compactly wound around the stowage bar. During outward extension of the shutter enclosure from the stowage box, the constant force pull of the spring members assists the roller drive mechanism in unwinding the cover and eliminates bunching or jamming of the slats.

In accordance with another embodiment of the invention, tensioning of the slats of the cover is effected by incorporating a pair of spring loaded pulley reels coaxial with and rotated by the stowage bar of the stowage box. Respective cables extending from the reels are guided by pulleys into the slat guide channels and are fastened to opposite sides of a slat at the far end of the cover. As in the first embodiment, regardless of the position of the cover relative to the stowage roller, the spring-loaded pulley reel maintains the cable and thereby the slats of the rollable enclosure in tension during both extension and retraction of the cover.

DETAILED DESCRIPTION

Figure 2:
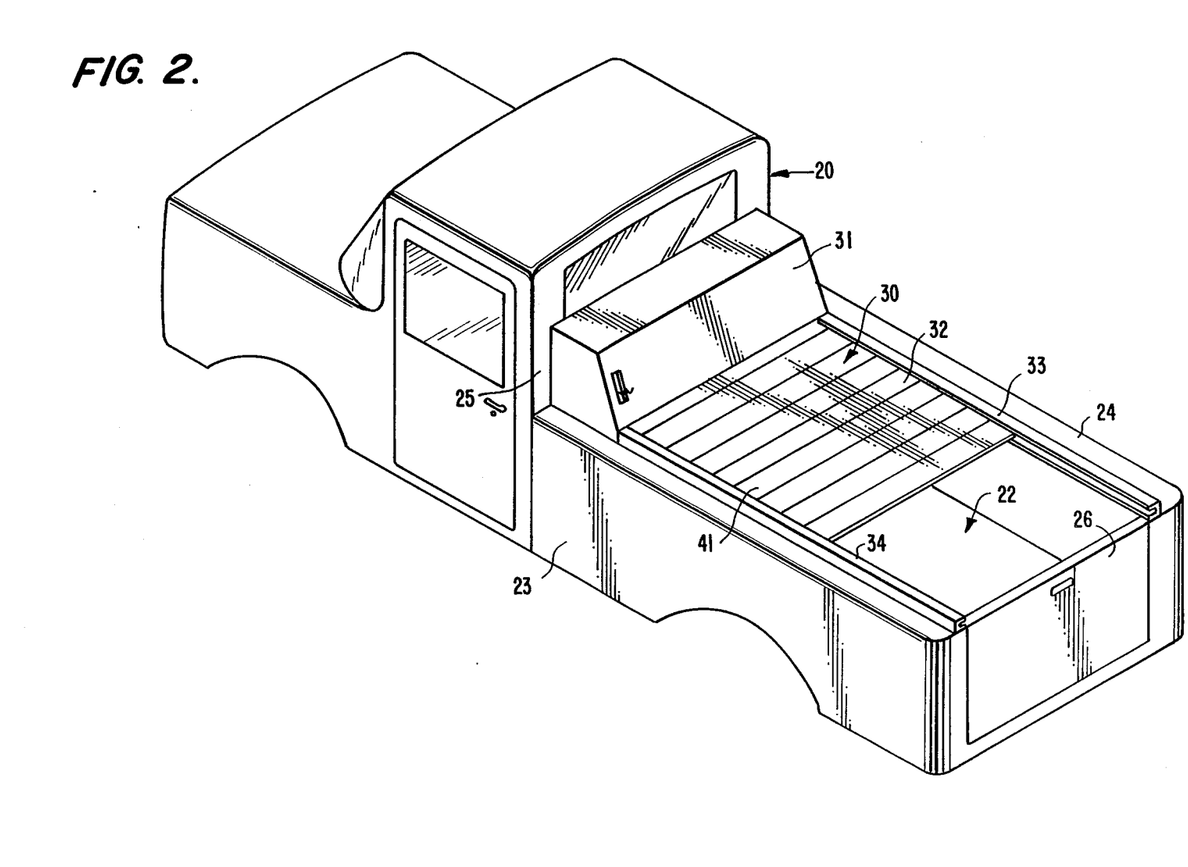
FIG. 2 is a diagrammatic pictorial illustration of an open bed vehicle (pickup truck) having a roll-up type slatted enclosure mechanism is accordance with the present invention.

FIG. 2 shows, diagrammatically, a vehicle 20, such as a light utility pickup truck, having a flat bed 22 the cargo capacity storage space of which is defined by respective sidewalls 23 and 24, an end wall 25 at the rear of the cab and a tail gate 26. Pursuant to the present invention, a roll-up slatted enclosure 30 is adapted to fit over the vehicle bed 22 so as to provide an extensible and retractable enclosure mechanism over the entire length of the bed 22. For this purpose, the enclosure assembly 30 comprises a protective stowage box 31 which houses a rotatable stowage bar about which a slatted cover 32 may be wound. In its fully retracted condition, cover 32 is wound around a stowage bar within the stowage box 31 so as to maximize to exposure area of the bed 22 for access by the vehicle user. Enclosure assembly 30 further comprises a pair of guide channels 33 and 34 which are preferably bolted to the tops or inner sides of the sidewalls 23 and 24. Guide channels 33 and 34 engage opposite ends of each of the slats 41 of which cover 32 is comprised so as to provide a track along which the slats of the cover 32 slide during their withdrawal from the stowage box 31 towards tailgate 26 and during retraction of the slatted cover for stowage within the stowage box 31.

Figure 3:
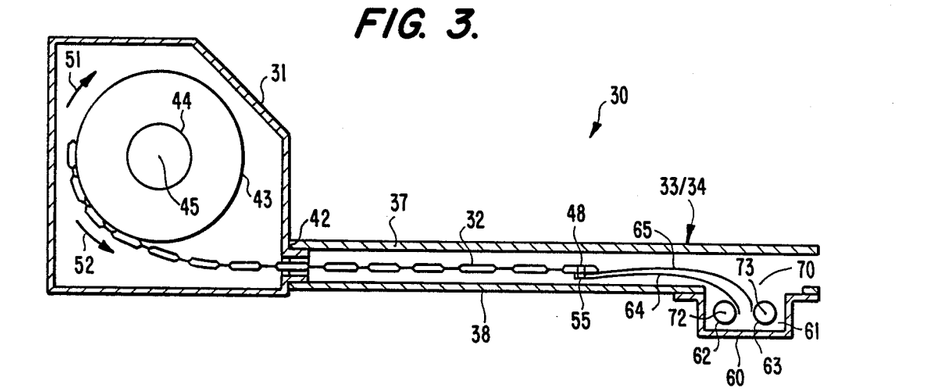
FIGS. 3 and 4 are respective side and top diagrammatic views of the roll-up vehicle bed enclosure mechanism in accordance with a first embodiment of the present invention.
Figure 4:
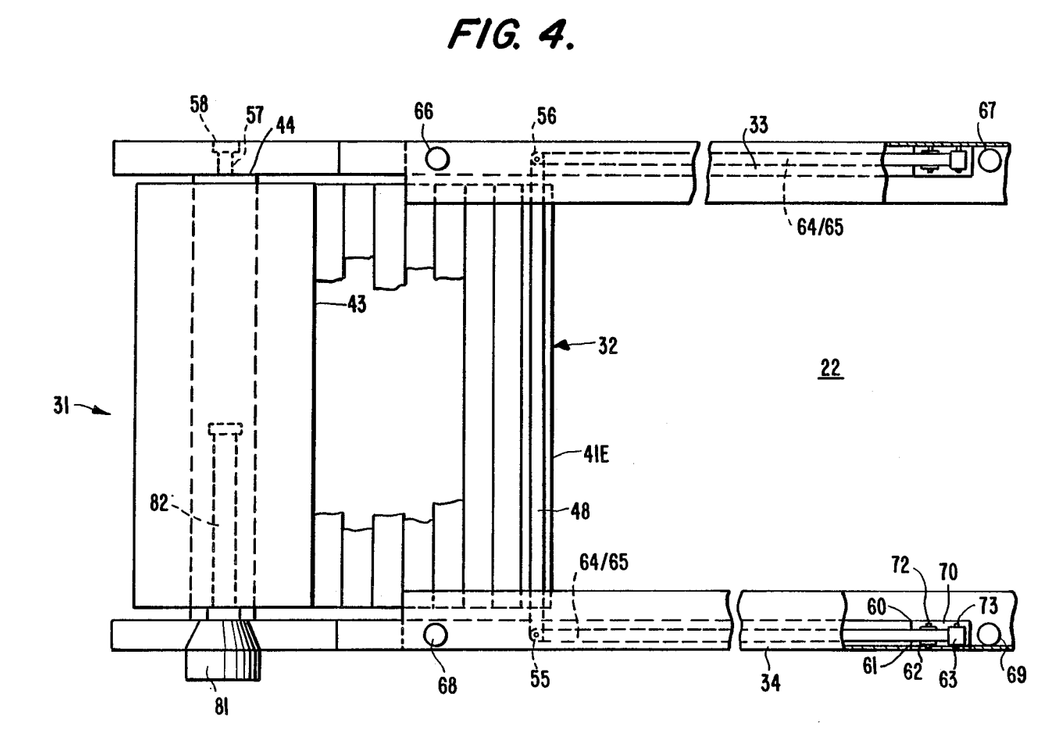

Referring now to FIGS. 3 and 4, respective diagrammatic side and top views of the enclosure assembly 30 are shown as including a stowage box 31 containing a rotatable stowage bar 44 rotatable about an axis 45 which extends in a direction transverse to the direction of travel of the cover 32, and a pair of guide channels 33 and 34 which are mounted to (e.g. bolted atop or inside of) the sidewalls 23 and 24 of the open flat bed of the vehicle 20. With cover 32 being releaseably engaged from the lower left-hand surface of stowage bar 44, as viewed in FIG. 3, arrow 51 indicates that rotatable stowage bar 44 is rotatable in both the clockwise direction, to retract cover 32, and arrow 52 indicates that bar 44 is rotatable in the counter-clockwise direction, to extend the slats of cover 32 for travel into the guide channels 33 and 34. (It should be noted that the cover may also be wound around stowage bar 44 in a direction reverse to that shown in FIG. 3. In this circumstance the axis 45 is translated downwardly from its position shown in FIG. 3 to accommodate travel of the cover between roll 43 and the guide channels.)

Each of guide channels 33 and 34 preferably has a square U-shaped cross-section with the open end of the U facing a respective opposite end of the slats 41 of the cover 32 to be slidably engaged thereby. Opposite legs 37 and 38 of the U-shaped guide channels are parallel to one another, with one of the legs being mounted to the top or inner side of one of the sidewalls of the truck bed, as shown in FIG. 3.

As illustrated in FIG. 4, stowage bar 44 has a rotatable shaft 57, one end of which rests in a bearing 58 at one end of the stowage box 31 and the other end of which is engaged by the drive shaft 82 of a drive motor 81 at the opposite end of the stowage box. Drive shaft 82 also preferably engages a manually driven gear mechanism (not shown) to permit the stowage bar to be rotated by hand through the operation of an externally coupled crank rod. As the details of the drive motor and crank mechanism are not necessary for an understanding of the present invention, further description will be omitted.

Rotatable stowage bar 44 is connected, e.g. by way of a belt, strap or screws, to a slat at one end of the cover 32. The interconnected slats 45 members of which the roll-up type cover 32 is comprised are windable about rotatable storage bar 44 as the rotatable stowage bar rotates in a clockwise direction as viewed in FIG. 3. In their fully stowed condition, the slats 45 of roll-up cover 32 are compactly wound around rotatable stowage bar 44 to form a slat roll 43, the outer diameter of which is completely accommodated within stowage box 31.

A second end slat of cover 32, shown at 41E, opposite to the end of cover 32 whereat the cover is attached to the rotatable stowage bar 44, is connected to a pair of tension-imparting spring mechanisms 61. In accordance with a first embodiment of the invention, the spring mechanisms may comprise a pair of constant force rotational spring devices formed of respective band springs 64 and 65 which are extensible from and retractable around a pair of spools 62 and 63 which rotate about spool support axes 72 and 73, as shown in FIG. 3. The dual spring mechanism is preferably mounted within a spring mechanism housing 60 which is bolted beneath and faces an aperture 70 in the bottom wall 38 of the guide channel, so as to permit the respective bands 64 and 65 of rotational constant force spring mechanism 61 to extend into the guide channel in the lengthwise direction of the guide channel and be attached at one end thereof to an end slat 41E of the rotatable cover. Attachment of the spring bands 64 and 65 to the end slat 41E may be effected by riveting the bands to a reenforcing bar 48 which extends through the end slat 41E.

Figure 5:
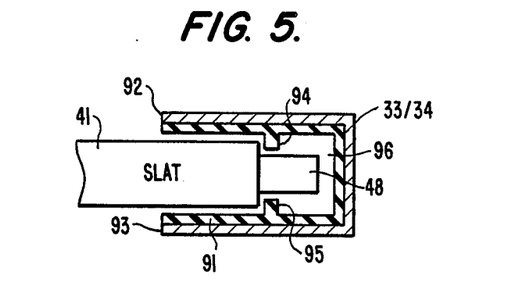
FIG. 5 is a diagrammatic cross-sectional illustration of the interior configuration of a guide channel.

FIG. 5 illustrates the cross-sectional configuration of a respective one of the guide channels 33 and 34. As described previously, each guide channel is preferably formed of a rectangular U-shaped aluminum channel within which the slats 41 of the cover 32 are slidable. To facilitate a sliding action between the slats 41 and the channels, each channel is preferably lined with a low friction (plastic) insert liner 91 which essentially conforms with the rectangular U-shaped cross-section of the channel. Liner 91 has a pair of end stop or lip portions 94 and 95 which extend the length of the channel and provide an abutment surface for the respective opposite ends of the slats 41. The reenforcing bar 48, which extends through the end slat 41E is thinner than the slat and clears the space between the lip portions 94 and 95 to enter an interior channel portion 96 through which the spring bands 64 and 65 of spring mechanism 61 extend during travel of the slats of the cover along the guide channels 33 and 34.

With the attachment of the bands 64 and 65 of constant force spring mechanism 61 through channels 33 and 34 to opposite sides of the end slat 41E of the multiple slatted enclosure cover 32, a tensile force is applied to the slats of the cover in a direction away from stowage bar 44. As a consequence, rather than dropping vertically from the tangential side portion of roll 43, as shown in FIG. 1, the slats are pulled horizontally in the direction of the channels and separate from a tangential edge portion of the roll 43 at the lower portion of the roll as viewed in FIG. 3.

Namely, the action of the spring mechanism 61 pulls or urges the slats in the direction of the channels in which the slats travel during both extension of the cover over the top of the bed and retraction of the cover into the stowage box. The force capacity of the spring mechanism will, of course, depend upon the size and weight of the slats of the rollable cover and on drive torque exerted on these slats by way of the rotation of stowage bar 44. What is important, in terms of achieving the objects of the present invention, is the tensile force imparting action of the spring mechanism to the slats so that the slats are prevented from drooping and bunching in the vicinity of the entry point 42 of the channels 33, 34.

Figure 6:
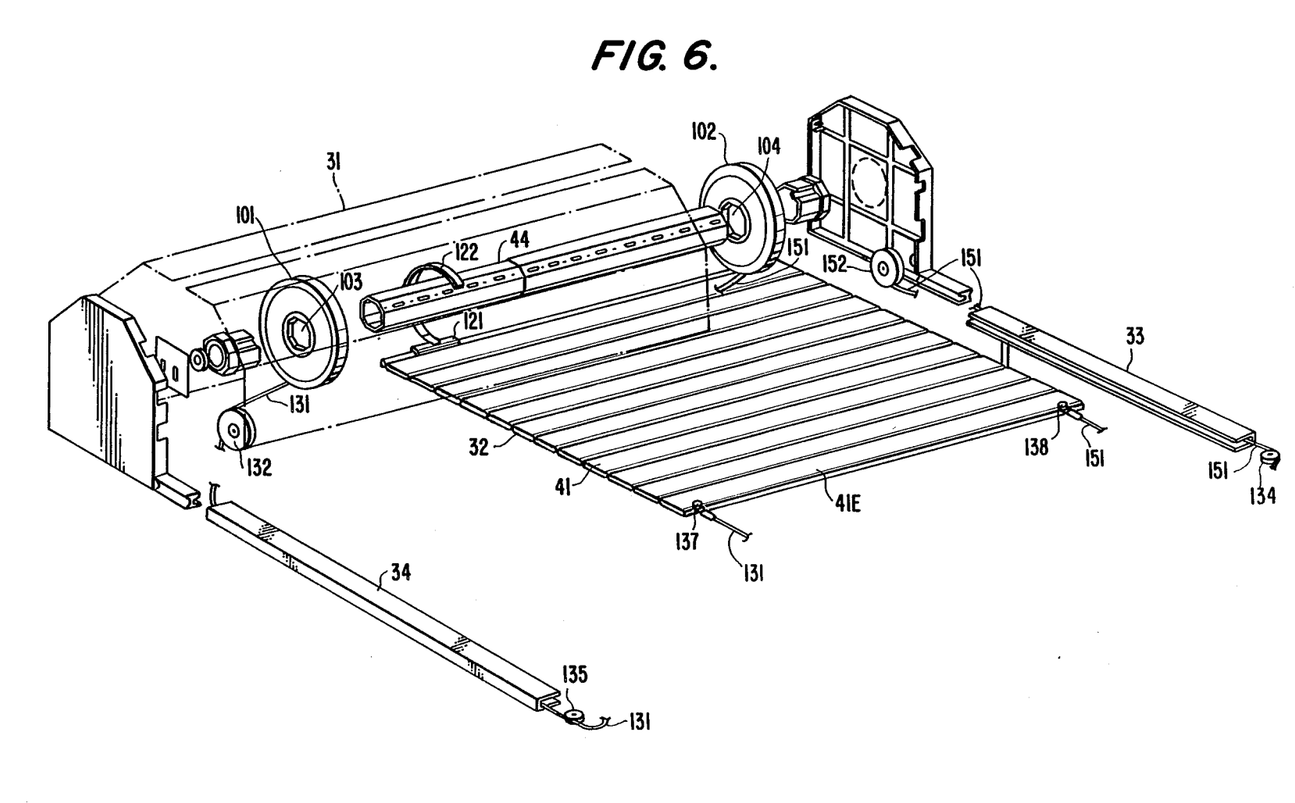
FIG. 6 is a diagrammatic exploded pictorial illustration of a roll-up slatted vehicle bed enclosure mechanism employing tension-imparting spring pulley reels.

An alternative scheme for imparting the tensile force to the slats is to use spring pulley reel mechanism manufactured by IMBAC Corporation of Milan, Italy diagrammatically shown in the exploded pictorial illustration of FIG. 6. In accordance with the use of this mechanism, tensile force is imparted to the slats by cables attached to a pair of spring pulley reels 101 and 102, respective octagonally shaped central apertures 103 and 104 of which are conformed to fixedly engage the octagonal outer surface of stowage bar 44, as shown. Respective cables 131 and 151 engage the pulley surfaces of spring pulley reels 101 and 102 and wind around guide pulleys 132 and 152, respectively as shown. From pulleys 132 and 152, cables 131 and 151 enter guide channels 34 and 33 and extend the length of the channels to respective pulleys 135 and 136 at the opposite ends thereof. Cables 131 and 151 return from pulleys 135 and 136 towards cover 32 and engage end slat 41E at fasteners 137 and 138 thereon. By virtue of the internal springs within spring pulley reels 101 and 102, the pulley reels cause cables 131 and 132 to be urged in a direction which winds the cables about the reels and thereby imparts a tensile force to end slat 41E and, consequently, to the remaining slats of the cover 32, linked thereto. As a result, the unwanted drooping and bunching of the slats shown diagrammatically in FIG. 1, discussed above, is prevented and the slats are properly guided into the channels 33 and 34 to facilitate the sliding action thereof during both the extension and retraction of the enclosure cover relative to the stowage box and associated guide channels.

As will be appreciated from the foregoing description, by incorporating a tensile force applying mechanism to the slats of the extensible and retractable enclosure cover, the present invention provides a practical structure through which a vehicle flat bed cargo area may be secured. Applicant has investigated alternate approaches to a mechanism which applies a tensile force to the slats of the cover and has found such mechanisms, which are essentially passive, to be incapable of effectively avoiding the bunching/jamming problem detailed above. These passive mechanisms include modifications to the guide channel to have upward tapered extensions which effectively wrap beneath the cover roll. Another approach includes the use of a continuous band feed wrapping around end pulleys for the interconnected slats of the cover. However, the same problem in each configuration remains; that is, passive guide mechanisms do not apply a tensile force to the slats of the cover in a direction away from their removal of the cover which avoids the bunching problem. The tensile force applying mechanism in accordance with the present invention overcomes undesirable drooping of the slats due to the effect of gravity and the consequential bunching of the slats as the slats are pushed by rotating stowage bar during extension of the multiple slatted cover.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use with an open-topped vehicle bed of the type having generally parallel sidewalls, a front wall and a tailgate, an enclosure assembly for controllably enclosing said open-topped vehicle bed comprising:

a rollable cover formed of a plurality of interconnected slat members;

a rotatable stowage bar about and by the rotation of which said cover is wound in its retracted condition and from and by the rotation of which said cover is unwound to its deployed condition over said open-topped vehicle bed;

guide means, arranged to be coupled with the respective sidewalls of said open-topped vehicle bed, and having an entrance for receiving said slat members from said rotatable stowage bar, for guiding said slat members during travel thereof as said cover is wound or unwound by rotation of said rotatable stowage bar; and means for preventing the slat members of said cover from becoming bunched together and jamming at the entrance to said guide means as said rotatable stowage bar is rotated to unwind said cover therefrom and thereby push said slat members toward said entrance of said guide means, said preventing means comprising spring tension means, coupled to said rotatable cover, for applying a tensile force to the slat members of said cover in a direction away from said stowage bar toward said guide means.

2. An enclosure assembly according to claim 1, wherein said tension means comprises means for maintaining the application of said tensile force to the slat members of said cover during the extraction of said cover from said rotatable stowage bar and during the retraction of said cover onto said rotatable stowage bar.

3. An enclosure assembly according to claim 1, wherein said tension means comprises at least one tension spring mechanism and means, coupled to one of said slat members, for providing a tension transferring linkage between said at least one tension spring mechanism and said one of said slat members and thereby the rollable cover of which said one of said slat members forms a part.

4. An enclosure assembly according to claim 1, wherein said tension means comprises at least one spring mechanism coupled to one of said slat members by way of said guide means.

5. An enclosure assembly according to claim 4, wherein said guide means comprises a pair of slat member travel guide channels arranged to receive opposite ends of the slat members of said cover for travel therethrough and wherein said tension means includes means for coupling said at least one spring mechanism to spaced apart locations on said one of said slat members through said pair of slat member travel guide channels.

6. An enclosure assembly according to claim 5, wherein said tension means comprises a pair of spring mechanisms respectively coupled to said spaced apart locations on said one of said slat members by way of said pair of slat member travel guide channels.

7. An enclosure assembly according to claim 6, wherein said pair of spring mechanisms comprise constant force spring devices.

8. An enclosure assembly according to claim 4, wherein said at least one spring mechanism comprises a pair of rotational spring devices respective axes of which are parallel to the axis of rotation of said stowage bar.

9. An enclosure assembly according to claim 8, wherein said guide means comprises a pair of slat member travel guide channels arranged to receive opposite ends of the slat members of said cover for travel therethrough and wherein said tension means includes means for coupling said pair of rotational spring devices to spaced apart locations on said one of said slat members through said pair of slat travel guide channels.

10. An enclosure assembly according to claim 1, wherein said spring mechanism comprises a constant force spring mechanism which applies a constant tensile force to the slat members of said cover in said direction away from said rotatable stowage bar towards said guide means.

11. An enclosure assembly according to claim 1, further including a rotatable drive motor having an output shaft which engages said rotatable stowage bar for rotating said rotatable stowage bar and thereby causing said cover to be wound or unwound with respect thereto.

12. In a method of controllably enclosing an open-topped vehicle bed of the type having generally parallel sidewalls, a front wall, a tailgate, and an enclosure assembly including a rollable cover formed of a plurality of interconnected slat members, a rotatable stowage bar about which said cover is wound in its retracted condition and from and by the rotation of which said cover is unwound to its deployed condition over said open-topped vehicle bed, and guide channels, arranged to be coupled with the respective sidewalls of said open-topped vehicle bed and having an entrance for receiving said slat members from said rotatable stowage bar, for guiding said slat members during travel thereof as said cover is wound or unwound by rotation of said rotatable stowage bar, the improvement comprising preventing the slats of said cover from becoming bunched together and jamming at the entrance to said guide channels as said rotatable stowage bar is rotated to unwind said cover therefrom and thereby push said slats toward said entrance of said guide channels by coupling, to the slat members of said cover, at least one spring mechanism which applies a tensile force to the slat members of said cover in a direction away from said rotatable stowage bar toward said guide channels.

13. The improvement according to claim 12, wherein said improvement comprises maintaining the application of said tensile force to the slat members of said cover during the extraction of said cover from said rotatable stowage bar and during the retraction of said cover onto said rotatable stowage bar.

14. The improvement according to claim 12, wherein said improvement comprises providing at least one tension spring mechanism and coupling a tension transferring linkage between said at least one tension spring mechanism and one of said slat members and thereby the rollable cover of which said one of said slat members forms a part.

15. The improvement according to claim 12 wherein the improvement comprises providing a pair of rotational spring devices respective axes of which are parallel to the axis of rotation of said stowage bar, and coupling a tension tranferring linkage between said pair of rotational spring devices and one of said slat members and thereby the rollable cover of which said one of said slat members forms a part.

16. The improvement according to claim 15, wherein said guide channels comprise a pair of slat member travel guide channels arranged to receive opposite ends of the slat members of said cover for travel therethrough and wherein said tensile force applying step includes the step of coupling said pair of rotational spring devices to spaced apart locations on said one of said slat members through said pair of slat member travel guide channels.

17. The improvement according to claim 12, wherein the improvement comprises
coupling to the slat members of said cover, at least one constant force spring mechanism which applies a tensile force to the slat members of said cover in a direction away from said rotatable stowage bar toward said guide channels.

18. An enclosure assembly for horizontally covering a structure comprising, in combination:
a rollable cover formed of a plurality of interconnected slat members;
a rotatable stowage bar about which said cover is wound in its retracted condition and from and by which said cover is unwound to its deployed condition over said structure;
guide means, arranged to be coupled with said structure and having an entrance for receiving said slat members from said rotatable stowage bar, for guiding said slat members during travel thereof as said cover is wound or unwound by rotation of said rotatable stowage bar; and
means for preventing the slat members of said cover from becoming bunched together and jamming at the entrance to said guide means as said rotatable stowage bar is rotated to unwind said cover therefrom and thereby push said slat members toward said entrance of said guide means, said preventing means comprising spring tension means, coupled to said rotatable cover, for applying a tensile force to the slat members of said cover in a direction away from said stowage bar toward said guide means.

19. An enclosure assembly according to claim 18, wherein said tension means comprises means for maintaining the application of said tensile force to the slat members of said cover during the extraction of said cover from said rotatable stowage bar and during the retraction of said cover onto said rotatable stowage bar.

20. An enclosure assembly according to claim 18, wherein said tension means comprises at least one tension spring mechanism and means, coupled to one of said slat members, for providing a tension transferring linkage between said at least one tension spring mechanism and said one of said slat members and thereby the rollable cover of which said one of said slat members forms a part.

21. An enclosure assembly according to claim 18, wherein said tension means comprises at least one spring mechanism coupled to one of said slat members by way of said guide means.

22. An enclosure assembly according to claim 21, wherein said guide means comprises a pair of slat member travel guide channels arranged to receive opposite ends of the slat members of said cover for travel therethrough and wherein said tension means includes means for coupling said at least one spring mechanism to spaced apart locations on said one of said slat members through said pair of slat member travel guide channels.

23. An enclosure assembly according to claim 22, wherein said tension means comprises a pair of spring mechanisms respectively coupled to said spaced apart locations on said one of said slat members by way of said pair of slat member travel guide channels.

24. An enclosure assembly according to claim 23, wherein said pair of spring mechanisms comprise constant force spring devices.

25. An enclosure assembly according to claim 21, wherein said at least one spring mechanism comprises a pair of rotational spring devices respective axes of which are parallel to the axis of rotation of said stowage bar.

26. An enclosure assembly according to claim 25, wherein said guide means comprises a pair of slat member travel guide channels arranged to receive opposite ends of the slat members of said cover for travel therethrough and wherein said tension means includes means for coupling said pair of rotational spring devices to spaced apart locations on said one of said slat members through said pair of slat travel guide channels.

27. An enclosure assembly according to claim 18, wherein said spring mechanism comprises a constant force spring mechanism which applies a constant tensile force to the slat members of said cover in said direction away from said rotatable stowage bar toward said guide means.

28. An enclosure assembly according to claim 18, further including a rotational drive motor having an output shaft which engages said rotatable stowage bar for rotating said rotatable stowage bar and thereby causing said cover to be wound or unwound with respect thereto.

29. In a method of horizontally enclosing a structure using an enclosure assembly, said enclosure assembly including a rollable cover formed of a plurality of interconnected slat members, a rotatable stowage bar about which said cover is wound in its retracted condition and from and by which said cover is unwound to its deployed condition over said structure, and guide channels, arranged to be coupled with said structure and having an entrance for receiving said slat members from said rotatable stowage bar for guiding said slat members during travel thereof as said cover is wound or unwound by rotation of said rotatable stowage bar, the improvement comprising preventing the slats of said cover from becoming bunched together and jamming at the entrance to said guide channels as said rotatable stowage bar is rotated to unwind said cover therefrom and thereby push said slats toward said entrance of said guide channels, by coupling, to the slat members of said cover, at least one spring mechanism which applies a tensile force to the slat members of said cover in a direction away from said rotatable stowage bar toward said guide channels.

30. The improvement according to claim 29, wherein said improvement comprises maintaining the application of said tensile force to the slat members of said cover during the extraction of said cover from said rotatable stowage bar and during the retraction of said cover onto said rotatable stowage bar.

31. The improvement according to claim 29, wherein said improvement comprises providing at least one tension spring mechanism and coupling a tension transferring linkage between said at least one tension spring mechanism and one of said slat members and thereby the rollable cover of which said one of said slat members forms a part.

32. The improvement according to claim 29 wherein the improvement comprises providing a pair of rotational spring devices respective axes of which are parallel to the axis of rotation of said stowage bar, and coupling a tension transferring linkage between said pair of rotational spring devices and one of said slat members and thereby the rollable cover of which said one of said slat members forms a part.

33. The improvement according to claim 32, wherein said guide channels comprise a pair of slat member travel guide channels arranged to receive opposite ends of the slat members of said cover for travel therethrough and wherein said tensile force applying step includes the step of coupling said pair of rotational spring devices to spaced apart locations on said one of said slat members through said pair of slat member travel guide channels.

34. The improvement according to claim 29, wherein the improvement comprises
coupling, to the slat members of said cover, at least one constant force spring mechanism which applies a tensile force to the slat members of said cover in a direction away from said rotatable stowage bar toward said guide channels.

35. For use with an open-topped vehicle bed for the type having generally parallel sidewalls, a front wall and a tailgate, an enclosure assembly for controllably enclosing said open-topped vehicle bed comprising, in combination:
a rollable cover formed of a plurality of interconnected slat members;
a rotatable stowage bar about which said cover is wound in its retracted condition and from and by which said cover is unwound to its deployed condition over said open-topped vehicle bed;
a rotational drive motor, having an output shaft which engages said rotatable stowage bar for rotating said rotatable stowage bar in a first direction and thereby causing said cover to be unwound from said rotatable stowage bar and for rotating said rotatable stowage bar in a second direction and thereby causing said cover to be wound around said rotatable stowage bar;
guide means, arranged to be coupled with the respective sidewalls of said open-topped vehicle bed and having an entrance for receiving said slat members from said rotatable stowage bar, and for guiding said slat members during travel thereof as said cover is wound or unwound by rotation of said rotatable stowage bar as driven by the output shaft of said rotation drive motor; and means for preventing the slat members of said cover from becoming bunched together and jamming at the entrance to said guide means as said rotatable stowage bar is rotated to unwind said cover therefrom and thereby push said slats toward said entrance of said guide means, said preventing means comprising at least one constant force spring mechanism, coupled to said rotatable cover, for applying a constant tensile force to the slat members of said cover in a direction away from said rotatable stowage bar toward said guide means during the unwinding of said cover from said rotatable stowage bar as said rotatable stowage bar is rotated in said first direction by said rotational drive motor and during the retraction of said cover from guide means and winding of said cover around said rotatable stowage bar as said rotatable stowage bar is rotated in said second direction by said rotation drive motor.

* * * * *